(12) United States Patent
Lee et al.

(10) Patent No.: US 8,460,840 B2
(45) Date of Patent: Jun. 11, 2013

(54) SEPARATOR FOR FUEL CELL AND FUEL CELL COMPRISING THE SAME

(75) Inventors: Ju-Hyung Lee, Seoul (KR); Yong-Shin Hwang, Seoul (KR); Suk-Won Cha, Seoul (KR); Jong-Won Choi, Seoul (KR)

(73) Assignee: XFC Inc., Seoul (KR)

( * ) Notice: Subject to any disclaimer, the term of this patent is extended or adjusted under 35 U.S.C. 154(b) by 762 days.

(21) Appl. No.: 12/643,144

(22) Filed: Dec. 21, 2009

(65) Prior Publication Data

US 2010/0159358 A1    Jun. 24, 2010

(30) Foreign Application Priority Data

Dec. 23, 2008 (KR) .................. 10-2008-0132538
Jun. 11, 2009 (KR) .................. 10-2009-0052029

(51) Int. Cl.
*H01M 8/04* (2006.01)
*H01M 8/24* (2006.01)

(52) U.S. Cl.
USPC ............................................ 429/514; 429/452

(58) Field of Classification Search
None
See application file for complete search history.

(56) References Cited

U.S. PATENT DOCUMENTS

| 2002/0110719 A1* | 8/2002 | Pien et al. ................ 429/35 |
| 2003/0072986 A1* | 4/2003 | Kusakabe et al. ........ 429/34 |
| 2007/0154772 A1* | 7/2007 | Chen et al. ............... 429/38 |

* cited by examiner

*Primary Examiner* — Barbara Gilliam
*Assistant Examiner* — Stephan Essex
(74) *Attorney, Agent, or Firm* — Alston & Bird LLP (57) ABSTRACT

A separator for a fuel cell is provided. The separator comprises a flow path member and a base separator. The flow path member is made of a graphite foil and has a flow path through which fluids pass. The base separator has a seating recess formed on the surface thereof. The flow path member is mounted in the seating recess. The flow path is formed by pressing the graphite foil. The separator can be produced at reduced processing cost in a short processing time.

10 Claims, 6 Drawing Sheets

SEPARATOR FOR FUEL CELL AND FUEL CELL COMPRISING THE SAME

CROSS REFERENCE TO RELATED APPLICATIONS

This application claims the benefit under 35 U.S.C. §119 (a) of Korean Patent Application Serial No. 10-2008-0132538, filed Dec. 23, 2008, and Korean Patent Application Serial No. 10-2009-0052029, filed Jun. 11, 2009, both of which are incorporated herein by reference in their entirety.

BACKGROUND OF THE INVENTION

1. Field of the Invention

The present invention relates to a separator for a fuel cell and a fuel cell comprising the separator. More specifically, the present invention relates to a separator for a fuel cell that can be produced at low cost while possessing the same performance characteristics as a graphite separator produced by mechanical processing, and a fuel cell comprising the separator.

2. Description of the Related Art

Fuel cells are energy sources that produce electrical energy through electrochemical reactions between hydrogen or a hydrocarbon fuel and an oxidant, typified by oxygen. In recent years, fuel cells have received considerable attention as the most promising clean energy sources for the future.

Such a fuel cell includes a stack for generating electricity, a fuel supply unit for supplying fuel to the stack, and an oxidant supply unit for supplying an oxidant to the stack. The stack has a structure in which membrane electrode assemblies and separators are stacked alternately. In the membrane electrode assemblies, the fuel is oxidized and the oxidant is reduced to generate electricity.

Many types of fuel cells have been developed. Of these, polymer electrolyte fuel cells are currently investigated as electrochemical devices for producing electric power from hydrogen due to their relatively low operating temperature and the possibility of reducing the size of stacks. At present, it is estimated that there is a high possibility of putting polymer electrolyte fuel cells to practical use. Such a polymer electrolyte fuel cell includes a plurality of cells electrically connected to each other by separators or bipolar plates.

Separators are conductive plates to separate respective cells of a fuel cell stack. Each of the separators functions as a fuel electrode (i.e. an anode) in one of the adjacent two cells and as an air electrode (i.e. a cathode) in the other cell. The separator serves to block a fuel gas and air. Other roles of the separator are to ensure a flow path for the fuel gas and the air and to deliver an electric current to an external circuit. Thus, the separator is required to have high electrical and thermal conductivity, good corrosion resistance and low gas permeability.

Separators are usually produced using resin-impregnated graphite plates, carbon composite plates, metal plates, etc. Flow paths are formed in separators to assist in the flow of fluids. The separators play a role in dissipating heat generated from cells over the entire structure of a fuel cell stack. Excessive heat generated from the cells is collected through air- or water-cooling heat exchange. The collected heat can be utilized or wasted without use.

Fuel cell separators developed hitherto are classified into resin-impregnated graphite separators, carbon composite separators and metal separators by the kind of materials they employ.

A typical resin-impregnated graphite separator is produced by impregnating a graphite plate with a resin, followed by mechanical processing to form a gas flow path. Resin-impregnated graphite separators have been mainly used from the early stage of research and development of fuel cells owing to their very high electrical and thermal conductivity and good corrosion resistance.

A typical carbon composite separator is produced by molding a carbon/resin mixture. Carbon composite separators may have slightly lower electrical and thermal conductivity than resin-impregnated graphite separators. Thus, efforts to find suitable resins and optimize molding processes for the production of carbon composite separators have been made to fabricate fuel cells having similar performance characteristics to fuel cells using resin-impregnated graphite separators.

A typical metal separator is produced by processing/casting/molding a metal (typically stainless steel). Metal separators have very high electrical and thermal conductivity but they are disadvantageously susceptible to corrosion. Thus, suitable processes, such as surface treatment, coating and alloying, are used to improve the corrosion resistance of metal separators for use in fuel cell stacks.

Since a fuel cell separator is involved in the migration of electrons within a fuel cell, the conductivity of electrons penetrating the plate is the most important factor in the separator. A fuel cell separator should have a flow path to distribute gases into a gas diffusion layer. Other requirements of a fuel cell separator are good impermeability to reactive gases or ions and high chemical stability. Taking into consideration the characteristics of the market for automobiles and portable products, which are expected to be the main application fields of polymer electrolyte fuel cells, fuel cell separators should be light in weight and be able to be produced on an industrial scale.

Fuel cell separators are essential elements that account for the largest portion (about 30-60%) of the material costs of elements constituting a fuel cell stack. Accordingly, a reduction in the production cost of fuel cell separators would be most important for the commercialization of the fuel cell separators.

Graphite is the most commonly used material for separators. When it is intended to use graphite as a material for separators, the graphite undergoes mechanical processing to form flow paths for reactive gases present in the separators. That is, the formation of the flow paths in the separators requires additional processing, which makes it difficult to mass-produce the separators and entails a considerable production cost.

It is estimated that carbon composite separators have the potential to replace graphite separators owing to their low price and light weight. A typical carbon composite separator is produced by molding a carbon/resin mixture. A long operation time is needed for the molding and curling is likely to occur when one side of the separator is formed by the molding. Further, the separator is difficult to achieve sufficient electrical conductivity, which is the most important factor of the separator, due to the low electrical conductivity inherent to the polymeric material. Further, a high temperature is needed to melt the polymer during molding, such as compression or injection molding, which is simpler than mechanical processing. Accordingly, the type of the polymeric material used for the molding is limited to a thermoplastic resin. The molding process is highly energy consumptive, which is economically disadvantageous.

Coating is necessary to protect metal separators from corrosion. The coating requires a long operation time and incurs an increase in production cost. The use of coating materials results in a reduction in the electrical conductivity of the metal separators.

SUMMARY OF THE INVENTION

In view of the foregoing and other problems of the prior art, a first object of the present invention is to provide a separator for a fuel cell that can be produced at low processing cost in a short processing time while possessing substantially the same performance characteristics as a graphite separator.

A second object of the present invention is to provide a fuel cell comprising the separator.

In order to accomplish the first object of the present invention, there is provided a separator for a stack of a fuel cell, comprising: a flow path member made of a graphite foil and having a flow path through which fluids pass; and a base separator having a seating recess formed on the surface thereof to mount the flow path member therein, wherein the flow path is formed by pressing the graphite foil.

The separator may further comprise one or more collector members provided close to the flow path member, and the base separator may have receiving portions penetrating the seating recess to accommodate the respective collector members.

Preferably, the collector members are made of graphite foils.

According to another embodiment of the present invention, there is provided a separator for a stack of a fuel cell, comprising: a flow path member made of a graphite foil and having a flow path through which fluids pass; and a base separator having a seating recess formed on the surface thereof to mount the flow path member therein, wherein the flow path is formed by punching the graphite foil so as to penetrate the flow path member.

The separator may further comprise a flow path supporting member positioned between the flow path member and the base separator and mounted in the seating recess, and one or more collector members provided close to the flow path supporting member; and the base separator may have receiving portions penetrating the seating recess to accommodate the respective collector members.

Preferably, the flow path supporting member and the collector members are made of graphite foils.

The base separator may be made of a polymer resin.

The flow path member may protrude from the base separator to form a step between the surface of the flow path member and the surface of the base separator.

Preferably, the height of the step is 10% or less smaller than the thickness of the flow path member.

In order to accomplish the second object of the present invention, there is provided a fuel cell comprising the separator.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Preferred embodiments of the present invention will now be described in more detail. However, it will be understood by those skilled in the art that these embodiments do not serve to limit the scope of the invention but are set forth for illustrative purposes.

Figure 1:
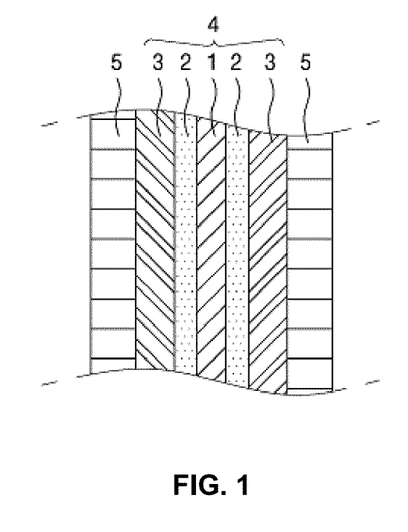
FIG. 1 schematically illustrates a portion of a stack of a polymer electrolyte fuel cell.

FIG. 1 schematically illustrates a stack of a polymer electrolyte fuel cell, which is a type of fuel cell.

Referring to FIG. 1, a pair of catalysis layers 2 are attached in close contact with both sides of a polymer electrolyte membrane 1. Each of the catalysis layers 2 is usually composed of a platinum catalyst and a carbon powder. A pair of gas diffusion layers 3 are arranged on the outer surfaces of the respective catalysis layers 2. The gas diffusion layers 3 are gas permeable and electrically conductive. The polymer electrolyte membrane 1, the catalysis layers 2 and the gas diffusion layers 3 are assembled together to construct a membrane electrode assembly (MEA) 4.

A pair of separators 5 are disposed on both sides of the membrane electrode assembly 4. With this configuration, a plurality of membrane electrode assemblies 4 are electrically connected in series with each other. Each of the separators 5 is formed with a flow path through which a fuel, such as hydrogen gas, and an oxidant gas are supplied to respective electrodes and gases created as a result of electrochemical reactions and the remaining unreacted fuel gas are released.

Figure 2:
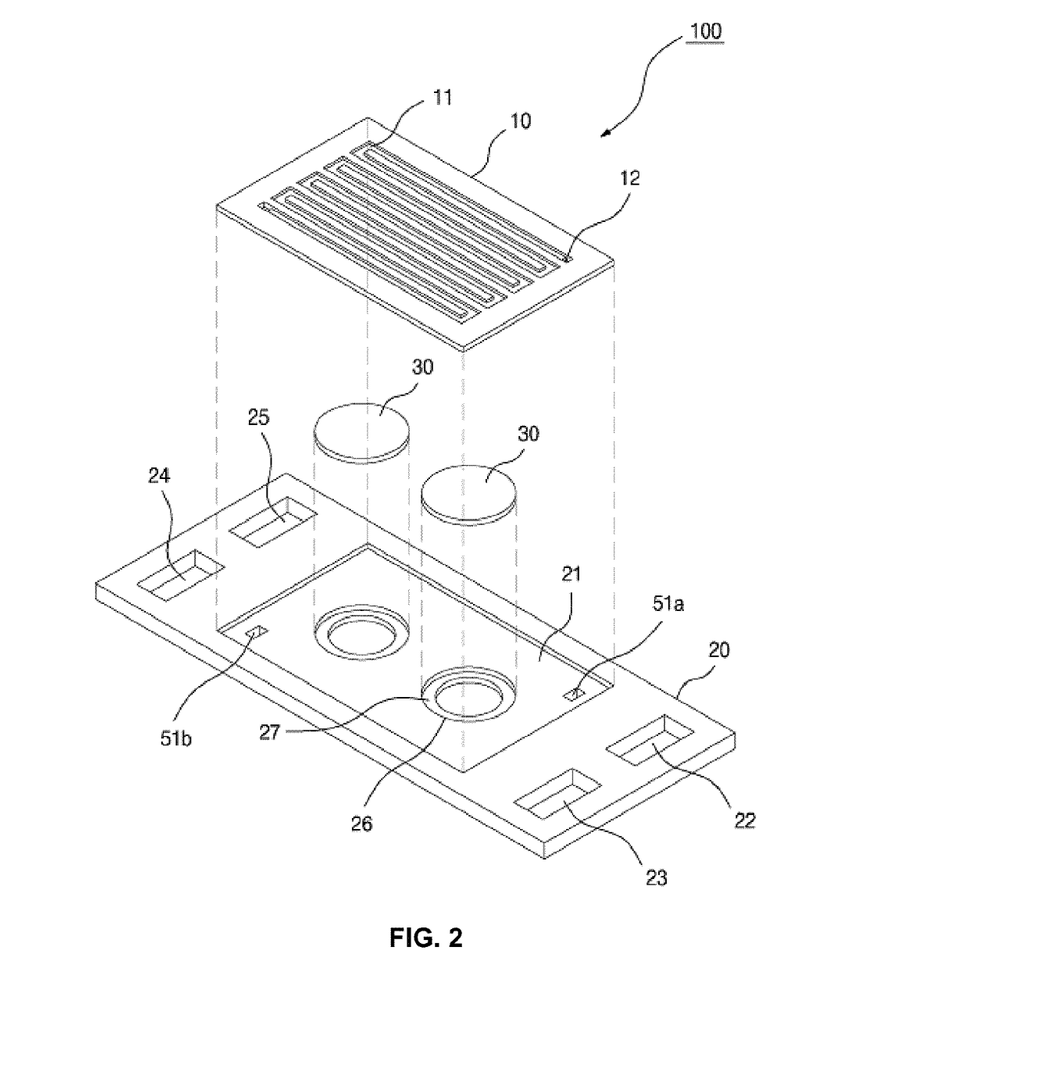
FIG. 2 is an exploded perspective view schematically illustrating a separator for a fuel cell according to an embodiment of the present invention.

FIG. 2 is an exploded perspective view schematically illustrating a separator 100 as a constituent element of a fuel cell according to an embodiment of the present invention.

The fuel cell separator 100 comprises a flow path member 10 having a flow path 11 through which fluids pass, and a base separator 20 having a seating recess 21 formed on the surface thereof to mount the flow path member 10 therein.

The flow path member 10 is made of a graphite foil. The flow path 11 is formed by pressing the graphite foil using a mold 11 or by punching the graphite foil so as to penetrate the flow path member. The mold has the same shape as the flow path 11. In comparison with a prior art fuel cell separator having a flow path formed by mechanical processing (e.g., CNC processing) of a graphite plate, the fuel cell separator 100 is advantageous in that the processing time and cost can be greatly reduced and the flow path can be processed into various shapes.

The flow path 11 illustrated in FIG. 2 has good chemical resistance and high electrical conductivity on account of its material properties. In addition, the flow path 11 is highly durable and can reduce the contact resistance with a gas diffusion layer. Accordingly, the fuel cell separator 100 can possess the inherent advantages of a conventional graphite separator integrally formed with a flow path.

Preferably, the flow path 11 formed by pressing has ends 12 through which reactive gases are introduced or released.

The flow path member 10 is mounted on the seating recess 21 of the base separator 20 and can be easily coupled to the base separator 20 by pressing. The seating recess 21 can play a role in preventing the flow path member 10 from being squeezed against the base separator 20 when the fuel cell separator 100 is fastened to a fuel cell stack.

As mentioned above, a plurality of flow path members made of graphite foils may be squeezed by a surface pressure when being stacked to construct a fuel cell stack. Particularly, the degree of the squeezing may be varied along the lengthwise direction of the fuel cell stack, and as a result, stress is not uniformly distributed over the flow path members. Further, the flow path members may be continuously deformed depending on a change in operating temperature during operation or stopping of the fuel cell. In contrast, the base separator 20 of the fuel cell separator 100 can protect the flow path member 10 mounted thereon from being squeezed or deformed.

Preferably, a sealing member (not shown) is provided along the periphery of the seating recess 21 to hermetically seal the flow path member 10 mounted on the base separator 20.

As in a conventional fuel cell separator, the base separator 20 has a fuel inlet hole 22, a fuel outlet hole 24, an oxidant inlet hole 23 and an oxidant outlet hole 25 at both sides thereof. A fuel enters and exits through the fuel inlet hole 22 and the fuel outlet hole 24, respectively, and an oxidant enters and exits through the oxidant inlet hole 23 and the oxidant outlet hole 25, respectively.

As illustrated in FIG. 2, the fuel cell separator 100 may further comprise collector members 30 provided close to the flow path member 10. The collector members 30 are positioned close to the lower side of the flow path member 10 to transfer electrons, which are generated by electrode reactions, in an electrically conductive manner. To facilitate the electron transfer, the collector members 30 are preferably made of highly electrically conductive graphite foils.

Receiving portions 26 are formed in the seating recess 21 of the base separator 20 to accommodate the respective collector members 30 therein. The receiving portions 26 are formed so as to penetrate the base separator 20. Constituent unit cells of a fuel cell stack can be electrically connected to each other through the collector members 30.

FIG. 2 illustrates two spherical collector members 30, but the number and shape of the collector members 30 are not limited thereto.

Each of the collector members 30 may have different upper and lower cross-sectional sizes in the thickness direction thereof to facilitate coupling to the corresponding receiving portion 26. With these dimensions, the collector members 30 can be prevented from slipping off in other directions when being placed on the respective receiving portions 26.

For example, each of the collector members 26 illustrated in FIG. 2 may have a shape in which two disks having different diameters are superimposed on each other in the thickness direction thereof. In this case, the receiving portions 26 are preferably formed such that they can be coupled to the respective collector members 30. Specifically, each of the receiving portions 26 may be formed with a stepped latching portion 27 in the thickness direction of the base separator. In this case, a sealing member, such as an O-ring, can be provided so as to surround each of the stepped latching portions to prevent reactive gases from leaking through the corresponding receiving portion 26.

The introduction of the flow path member 10 and the collector members 30, all of which are made of graphite foils, in this embodiment eliminates the need to use graphite as a material for the base separator 20, contributing to a reduction in the production cost of the base separator 20. For example, the base separator 20 can be made of an inexpensive and highly corrosion resistant material, such as a non-conductive material like a polymer resin.

In conclusion, the fuel cell separator 100 can be produced at low cost without the need to use graphite as a whole while possessing the same performance characteristics as conventional graphite separators.

Figure 3:
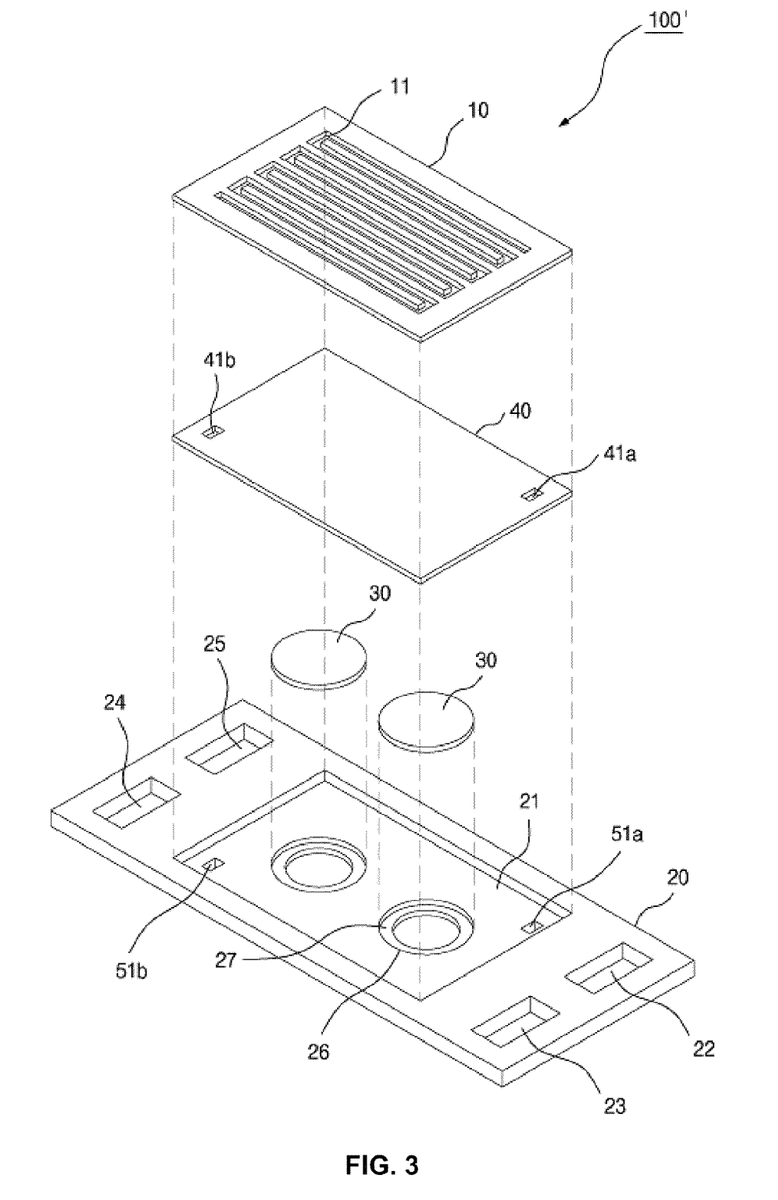
FIG. 3 is an exploded perspective view schematically illustrating a separator for a fuel cell according to another embodiment of the present invention.

FIG. 3 is an exploded perspective view schematically illustrating a separator 100' as a constituent element of a fuel cell according to another embodiment of the present invention. The fuel cell separator 100' has substantially the same constitution as the fuel cell separator illustrated in FIG. 2, except that the fuel cell separator 100' further comprises a flow path supporting member 40.

The flow path 11 is formed by punching a graphite foil so as to penetrate the flow path member 10. In this embodiment, the flow path supporting member 40 is provided between the flow path member 11 and the base separator 20. With this configuration, the flow path member 10 and the flow path supporting member 40 define a path through which reactive gases flow.

The flow path supporting member 40 has substantially the same size as the flow path member 10 so that it can be fixedly mounted together with the flow path member 10 in the seating recess 21 of the base separator 20. The flow path supporting member 40 is preferably made of the same material (i.e. a graphite foil) as the flow path member 10.

The flow path supporting member 40 has an intermediate inlet hole 41a and an intermediate outlet hole 41b at both sides thereof. The intermediate holes 41a and 41b are in communication with the fuel inlet hole 22 (or the oxidant inlet hole 23) and the fuel outlet hole 24 (or the oxidant outlet hole 25), respectively. Due to this structure, a fuel supplied through the fuel inlet hole 22 reaches the flow path 11 of the flow path member 10 via the intermediate inlet hole 41a and is released from the fuel cell separator 100' via the intermediate outlet hole 41b and the fuel outlet hole 24. A flow of an oxidant in the fuel cell separator 100' is the same as that of the fuel.

The flow path member 10 can be sealed to the base separator 20 by a sealing member (not shown). This sealing structurally allows the fuel inlet hole 22 (or the oxidant inlet hole 23) and the fuel outlet hole 24 (or the oxidant outlet hole 25), which are formed at both sides of the base separator 20, to be in indirect communication with the flow path 11.

Figure 4:
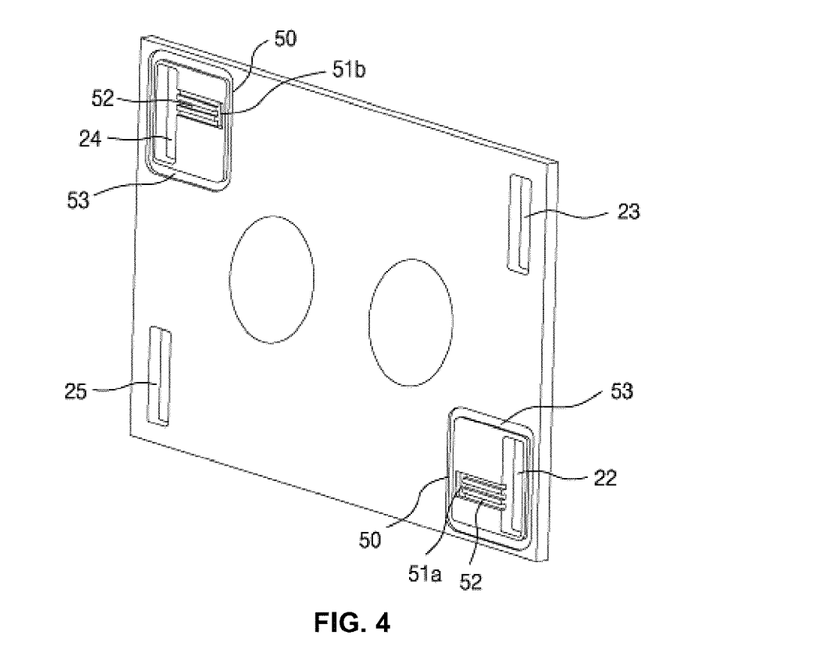
FIG. 4 is a schematic view illustrating the lower side of a base separator of the fuel cell separator of FIG. 3.

As one example, FIG. 4 schematically illustrates flow path connecting portions 50 formed at the lower side of the base separator 20.

Specifically, the flow path connecting portions 50 are formed such that the fuel inlet hole 22 (or the oxidant inlet hole 23) and the fuel outlet hole 24 (or the oxidant outlet hole 25) are in communication with the flow path 11 of the flow path member 10.

The flow path connecting portions 50 are formed symmetrically to each other in a diagonal direction at both sides of the base separator 20 so as to correspond to the ends of the flow path 11. That is, the two flow path connecting portions 50 are formed in communication with the fuel inlet hole 22 (or the oxidant inlet hole 23) and the fuel outlet hole 24 (or the oxidant outlet hole 25), respectively.

One of the flow path connecting portions 50 has a supply hole 51a in communication with one end of the flow path 11 of the flow path member 10 and one or more connection channels 52 through which the supply hole 51a is in communication with the fuel inlet hole 22. Due to this structure, a fuel entering through the fuel inlet hole 22 reaches the flow path 11 of the flow path member 10 through the connection channels 52 and the supply hole 51a.

Similarly, the other flow path connecting portion 50 has a discharge hole 51b in communication with the other end of the flow path 11 of the flow path member 10 and one or more connection channels 52 through which the discharge hole 51b is in communication with the fuel outlet hole 24.

A sealing portion 53 may be formed at the periphery of each of the flow path connecting portions 50. A sealing member can be attached to each of the sealing portions 53 to prevent reactive gases from leaking through the corresponding flow path connecting portion 50.

These manifold structures can ensure the formation of paths for fluids in the fuel cell separator according to the present invention. The structures of the flow path connecting portions are not limited to this embodiment. It will be understood by those skilled in the art that various modifications and variations are possible in the structures of the flow path connecting portions.

Although the present invention has been described with reference to the foregoing embodiments having a constitution in which the flow path member is mounted on one surface of the base separator, those skilled in the art will appreciate that the same constitution can also be applied to the other surface of the fuel cell separator to provide a bipolar plate in which paths for reactive gases are formed on both surfaces of the fuel cell separator.

Figure 5:
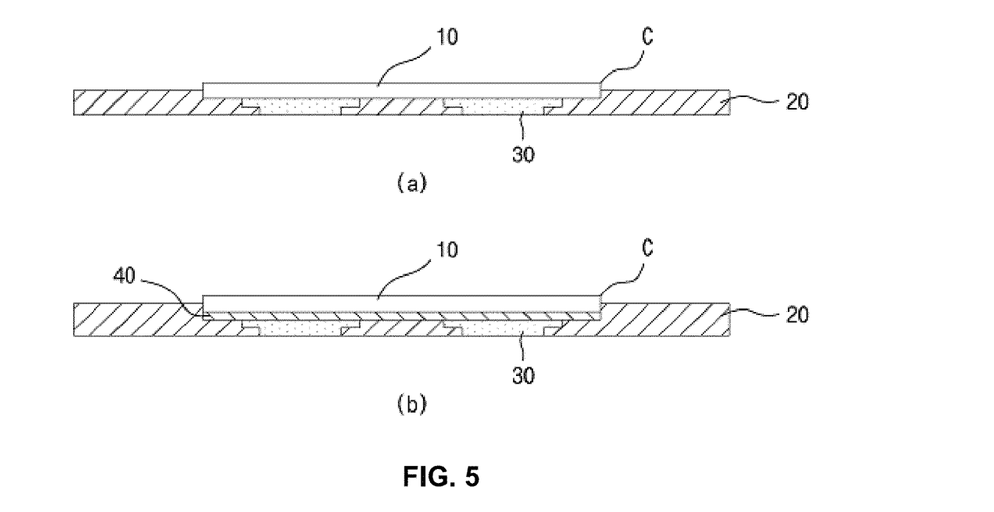
FIGS. 5a and 5b are schematic cross-sectional views illustrating assembled states of the fuel cell separators of FIGS. 2 and 3, respectively.

FIGS. 5a and 5b are cross-sectional views schematically illustrating assembled states of the fuel cell separators according to the embodiment of the present invention. Specifically, FIG. 5a illustrates the fuel cell separator 100 of FIG. 2 in which the flow path is formed by pressing, and FIG. 5b illustrates the fuel cell separator 100' of FIG. 3 in which the flow path is formed by punching and the flow path supporting member 40 is further provided.

As illustrated in each of FIGS. 5a and 5b, a step C (enlarged for emphasis) may be formed between the surface of the flow path member 10 and the surface of the base separator 20. The formation of the step C can be accomplished by controlling the depth of the seating recess 21 to allow the flow path member 10 to protrude from the base separator 20. When the fuel cell separator is assembled to a membrane electrode assembly to construct a fuel cell stack, the step C strongly presses a gas diffusion layer in contact with the fuel cell separator to reduce resistance loss, resulting in improved performance of the stack.

Figure 6:
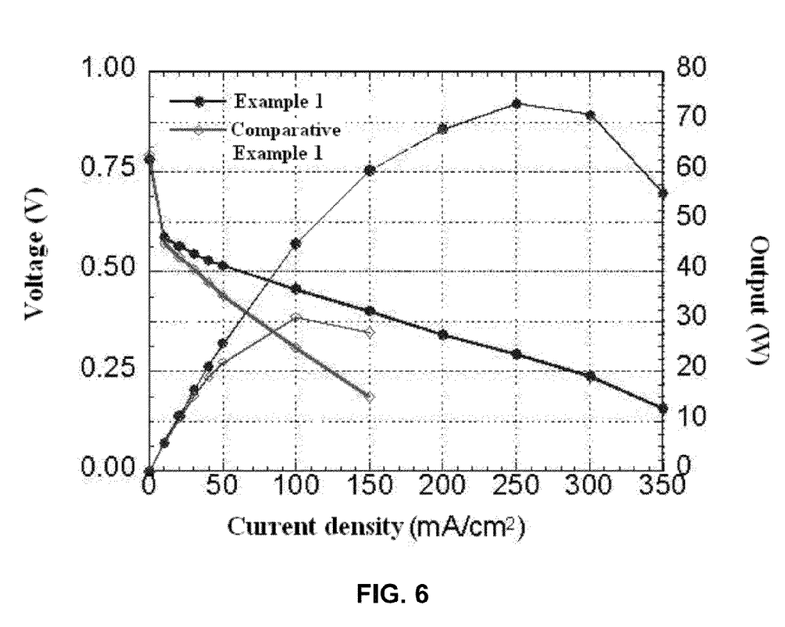
FIG. 6 is a graph showing variations in the voltage and output of a fuel cell separator of Example 1 with a step and a fuel cell separator of Comparative Example 1 without a step as a function of current density.

FIG. 6 is a graph comparing the performance characteristics of a fuel cell of Example 1 with the performance characteristics of a fuel cell of Comparative Example 1 as a function of current density. In the fuel cell of Example 1, the flow path member 10 was made of a 1 mm thick graphite foil and the step C had a height of 0.1 mm, which corresponds to 10% of the thickness of the flow path member 10. The fuel cell of Comparative Example 1 had no step. As can be clearly known from the graph, the fuel cell of Example 1 produced higher voltages and outputs at various current densities than the fuel cell of Comparative Example 1. Particularly, the voltage-current density curves of FIG. 6 reveal that the resistance of the fuel cell of Example 1 was greatly reduced when compared to that of the fuel cell of Comparative Example 1, which indicates a reduction of resistance loss in the fuel cell of Example 1.

Figure 7A:
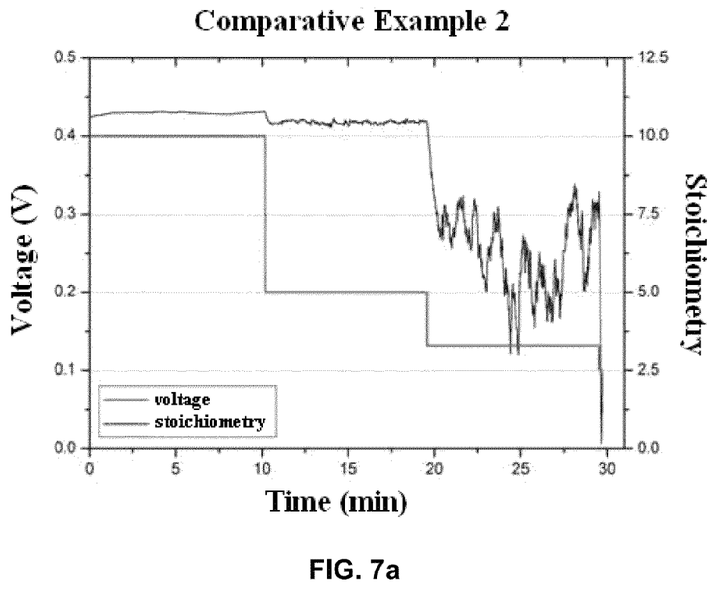
FIGS. 7a and 7b are graphs showing changes in the voltage of fuel cell separators of Comparative Example 2 and Example 2 having different steps with varying stoichiometries of an oxidant supplied, respectively.
Figure 7B:
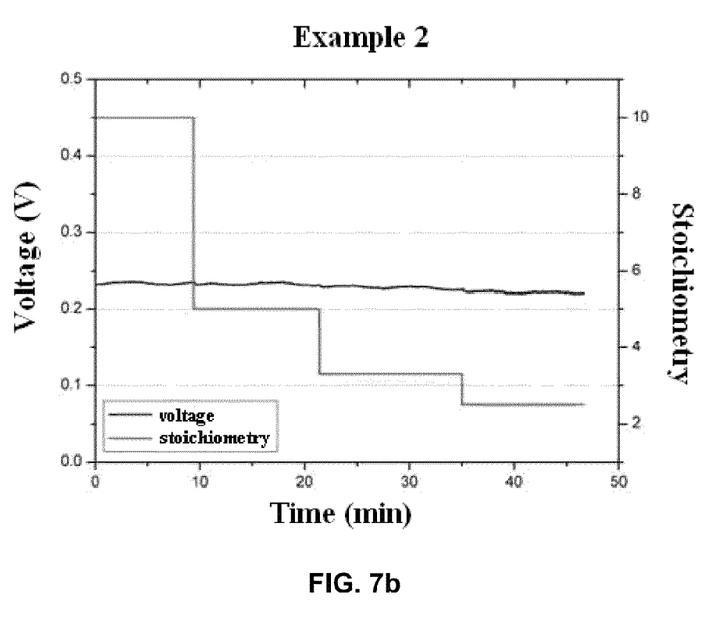

FIGS. 7a and 7b are graphs showing changes in the voltage of fuel cell separators of Comparative Example 2 and Example 2 having different steps C with varying stoichiometries of an oxidant supplied as a function of time, respectively. In the fuel cell of Comparative Example 2, the flow path member had a thickness of 1 mm and the step had a height of 0.2 mm (corresponding to 20% of the thickness of the flow path member). In the fuel cell of Example 2, the flow path member had a thickness of 1 mm and the step had a height of 0.02 mm (corresponding to 2% of the thickness of the flow path member). The voltage of the fuel cell of Comparative Example 2 was kept constant at about 0.4 V above a predetermined stoichiometry but it dropped with a dramatic variation at a stoichiometry lower than 5. Meanwhile, the voltage of the fuel cell of Example 2 was kept constant at about 0.24 V at a stoichiometry of about 2.5 or higher.

The experimental results shown in FIGS. 7a and 7b lead to the following conclusion. When the height of the step exceeds a predetermined value, a dramatic drop and variation in voltage is observed depending on the value of the stoichiometry, leading to deterioration in the performance of the fuel cell. This problem can be solved by a high stoichiometry, but there is a need to limit the height of the step to below a predetermined level taking into account the increased energy consumption resulting from the supply of the oxidant above the stoichiometry. From the experimental results shown in FIGS. 6 and 7, it is found that it is preferable to set the height of the step C between the flow path member 10 and the base separator 20 to 10% or less of the thickness of the flow path member 10. This conclusion is supported by the following theoretical considerations. The height of the step causes a change in the porosity of a gas diffusion layer in contact with the flow path member. As the height of the step increases, the step strongly presses the gas diffusion layer, leading to reduction of resistance loss. However, the strong pressing also decreases the porosity of the gas diffusion layer, resulting in an increase in mass transport loss. In the meantime, an excessively large height of the step relatively increases the volume of a stack including the fuel cell separator, which is not suitable for a fuel cell that is required to be light in weight and small in size. Therefore, it can be recognized that the height of the step should be limited to a predetermined level in order to improve the performance of the fuel cell.

As is apparent from the above description, the flow path member of the fuel cell separator according to the present invention is made by pressing or punching a graphite foil. This processing enables the production of the fuel cell separator at low cost in a short time.

In addition, the introduction of the flow path supporting member and/or the collector members makes it possible to form the base separator using a non-conductive material, such as a polymer resin, thus enabling the production of the fuel cell separator in a more economical manner.

Furthermore, a step is formed between the flow path member and the base separator to reduce resistance loss, contributing to a further improvement in the performance of the fuel cell.

What is claimed is:
1. A separator for a stack of a fuel cell, comprising:
a flow path member made of a graphite foil and having a flow path through which fluids pass; and
a base separator having a seating recess formed on the surface thereof to mount the flow path member therein, wherein the flow path is formed by pressing the graphite foil, and
wherein the separator further comprises one or more collector members provided in contact with the flow path member and the base separator has receiving portions penetrating the seating recess to accommodate the respective collector members.

2. The separator of claim 1, wherein the flow path member protrudes from the base separator to form a step between the surface of the flow path member and the surface of the base separator.

3. The separator of claim 1, wherein the collector members are made of graphite foils.

4. The separator of claim 1, wherein the base separator is made of a polymer resin.

5. A separator for a stack of a fuel cell, comprising:
a flow path member made of a graphite foil and having a flow path through which fluids pass; and
a base separator having a seating recess formed on the surface thereof to mount the flow path member therein,
wherein the flow path is formed by punching the graphite foil so as to penetrate the flow path member, and
wherein the separator further comprises a flow path supporting member positioned between the flow path member and the base separator and mounted in the seating recess, and one or more collector members provided in contact with the flow path supporting member, and the base separator has receiving portions penetrating the seating recess to accommodate the respective collector members.

6. The separator of claim 5, wherein the flow path supporting member and the collector members are made of graphite foils.

7. The separator of claim 5, wherein the base separator is made of a polymer resin.

8. The separator of claim 5, wherein the flow path member protrudes from the base separator to form a step between the surface of the flow path member and the surface of the base separator.

9. The separator of claim 8, wherein the height of the step is 10% or less of the thickness of the flow path member.

10. A fuel cell comprising:
a separator for a stack of a fuel cell, the separator comprising:
a flow path member made of a graphite foil and having a flow path through which fluids pass; and
a base separator having a seating recess formed on the surface thereof to mount the flow path member therein,
wherein the flow path is formed by one of pressing the graphite foil and punching the graphite foil so as to penetrate the flow path member, and
wherein the separator further comprises one or more collector members provided in contact with the flow path member and the base separator has receiving portions penetrating the seating recess to accommodate the respective collector members.

* * * * *